United States Patent
Jang et al.

(10) Patent No.: US 12,261,320 B2
(45) Date of Patent: Mar. 25, 2025

(54) BATTERY MODULE WITH REINFORCED SAFETY

(71) Applicant: LG ENERGY SOLUTION, LTD., Seoul (KR)

(72) Inventors: Sung-Hwan Jang, Daejeon (KR); Myung-Ki Park, Daejeon (KR); Jun-Yeob Seong, Daejeon (KR); Hyoung-Suk Lee, Daejeon (KR); Hye-Mi Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/033,874

(22) PCT Filed: Jun. 21, 2022

(86) PCT No.: PCT/KR2022/008811
§ 371 (c)(1),
(2) Date: Apr. 26, 2023

(87) PCT Pub. No.: WO2022/270880
PCT Pub. Date: Dec. 29, 2022

(65) Prior Publication Data
US 2023/0411780 A1    Dec. 21, 2023

(30) Foreign Application Priority Data
Jun. 22, 2021   (KR) .................. 10-2021-0081116

(51) Int. Cl.
*H01M 50/358* (2021.01)
*H01M 50/211* (2021.01)

(52) U.S. Cl.
CPC ....... *H01M 50/358* (2021.01); *H01M 50/211* (2021.01); *H01M 2220/20* (2013.01)

(58) Field of Classification Search
CPC ............ H01M 50/202; H01M 50/211; H01M 2220/20; H01M 50/358
(Continued)

(56) References Cited

U.S. PATENT DOCUMENTS

2012/0045672 A1   2/2012  Kruger
2013/0095355 A1*  4/2013  Okutani .............. H01M 50/342
                                                           429/88
(Continued)

FOREIGN PATENT DOCUMENTS

CN       111384328 A    7/2020
CN       212011077 U   11/2020
(Continued)

OTHER PUBLICATIONS

International Search Report (PCT/ISA/210) issued in PCT/KR2022/008811, dated Oct. 20, 2022.
(Continued)

*Primary Examiner* — Christian Roldan
*Assistant Examiner* — Robert Gene West
(74) *Attorney, Agent, or Firm* — Birch, Stewart, Kolasch & Birch, LLP

(57) ABSTRACT

A battery module includes a structure so that gas or flame generated inside the battery module may be discharged stably. The battery module includes a cell assembly having at least one battery cell; a module case configured to accommodate the cell assembly in an inner space thereof and have a venting hole formed therein to discharge a venting gas generated from the cell assembly; and a venting unit provided at an outer side of the module case and configured to include an outer housing and an inner housing made of different materials, the venting unit being configured such that the venting gas discharged from the venting (Continued)

hole is introduced therein to flow along a surface of the inner housing and is discharged to the outside.

14 Claims, 8 Drawing Sheets

(58) Field of Classification Search
    USPC .............................................................. 429/82
    See application file for complete search history.

(56) References Cited

U.S. PATENT DOCUMENTS

| | | | |
|---|---|---|---|
| 2013/0342168 A1* | 12/2013 | Okumura | H02J 7/0068 320/167 |
| 2018/0108892 A1 | 4/2018 | Kim et al. | |
| 2019/0097192 A1 | 3/2019 | Kim et al. | |
| 2019/0173074 A1 | 6/2019 | Ogawa et al. | |
| 2021/0036284 A1* | 2/2021 | Schüssler | H01M 50/209 |
| 2021/0123291 A1* | 4/2021 | Schroder | E06B 3/56 |
| 2021/0320374 A1 | 10/2021 | Lee et al. | |
| 2022/0077539 A1 | 3/2022 | Ren et al. | |
| 2022/0123428 A1 | 4/2022 | Wakabayashi et al. | |
| 2022/0158297 A1* | 5/2022 | Tada | H01M 50/298 |
| 2022/0173471 A1 | 6/2022 | Toya et al. | |
| 2022/0263191 A1 | 8/2022 | Park | |

FOREIGN PATENT DOCUMENTS

| | | |
|---|---|---|
| JP | 2015-133169 A | 7/2015 |
| JP | 2015-195150 A | 11/2015 |
| JP | 2018-46043 A | 4/2016 |
| JP | 2019-102421 A | 6/2019 |
| JP | 2021-72177 A | 5/2021 |
| KR | 10-2019-0036260 A | 4/2019 |
| KR | 10-1998224 B1 | 7/2019 |
| KR | 10-2030726 B1 | 10/2019 |
| KR | 10-2020-0107213 A | 9/2020 |
| KR | 10-2169373 B1 | 10/2020 |
| KR | 10-2021-0015197 A | 2/2021 |
| KR | 10-2021-0044534 A | 4/2021 |
| WO | WO 2014/024433 A1 | 2/2014 |
| WO | WO 2020/003800 A1 | 1/2020 |
| WO | WO 2020/153018 A1 | 7/2020 |
| WO | WO 2020/189424 A1 | 9/2020 |
| WO | WO-2020196267 A1 * 10/2020 .......... H01M 50/213 |  |

OTHER PUBLICATIONS

Extended European Search Report for European Application No. 22828727.2, dated Sep. 9, 2024.

* cited by examiner

BATTERY MODULE WITH REINFORCED SAFETY

TECHNICAL FIELD

The present application claims priority to Korean Patent Application No. 10-2021-0081116 filed on Jun. 22, 2021 in the Republic of Korea, the disclosures of which are incorporated herein by reference.

The present disclosure relates to a battery, and more particularly, to a battery module with reinforced safety, and a battery pack and a vehicle including the battery module.

BACKGROUND ART

As the demand for portable electronic products such as notebook computers, video cameras and portable telephones is rapidly increasing and robots and electric vehicles are commercialized in earnest, high-performance secondary batteries capable of repeated charging and discharging are being actively researched.

Currently commercialized secondary batteries include nickel cadmium battery, nickel hydrogen battery, nickel zinc battery, lithium secondary battery, and so on. Among these, the lithium secondary battery has almost no memory effect to ensure free charge and discharge, compared to the nickel-based secondary battery, and the lithium secondary battery is spotlighted due to a very low discharge rate and a high energy density.

The lithium secondary battery mainly uses a lithium-based oxides and a carbon material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed therebetween, and an exterior, or a battery case, for hermetically accommodating the electrode assembly together with an electrolyte.

Generally, the lithium secondary batteries may be classified into a can-type secondary battery having an electrode assembly included in a metal can and a pouch-type secondary battery having an electrode assembly included in a pouch of an aluminum laminate sheet, depending on the shape of the exterior.

Recently, secondary batteries are widely used for driving or energy storage not only in small devices such as portable electronic devices but also in medium and large devices such as electric vehicles and energy storage systems (ESS). These secondary batteries may constitute one battery module in such a form that a plurality of secondary batteries are electrically connected and are stored together in a module case. In addition, a plurality of battery modules may be connected to form one battery pack.

However, when a plurality of battery modules are included in the battery pack as described above, this structure may be vulnerable to a thermal chain reaction between the battery modules. For example, when an event such as a thermal runaway occurs inside one battery module, propagation of the thermal runaway to other battery modules needs to be suppressed. If the propagation of thermal runaway between battery modules is not suppressed, the event occurring in a specific battery module causes a chain reaction of several battery modules, which may cause an explosion or fire or increase the scale.

In particular, when an event such as thermal runaway occurs in any one battery module, gas or flame may be discharged to the outside. At this time, if the emission of gas or flame is not properly controlled, the gas or flame may discharged toward other battery modules, which may cause a thermal chain reaction of others battery modules.

DISCLOSURE

Technical Problem

The present disclosure is designed to solve the problems of the related art, and therefore the present disclosure is directed to providing a battery module with an improved structure so that gas or flame generated inside the battery module may be discharged stably, and a battery pack and a vehicle including the battery module.

However, the technical problem to be solved by the present disclosure is not limited to the above, and other problems not mentioned herein will be clearly understood by those skilled in the art from the following disclosure.

Technical Solution

In one aspect of the present disclosure, there is provided a battery module, comprising: a cell assembly having at least one battery cell; a module case configured to accommodate the cell assembly in an inner space thereof and have a venting hole formed therein to discharge a venting gas generated from the cell assembly; and a vent cover provided at an outer side of the module case and including an outer housing and an inner housing made of different materials, the vent cover being configured such that the venting gas discharged from the venting hole is introduced therein to flow along a surface of the inner housing and is discharged to the outside.

Here, the outer housing may be configured in a plate form having at least one end bent, and the inner housing may be configured to cover an inner surface of the outer housing.

In addition, an outer perimeter of the outer housing may be at least partially coupled to an outer surface of the module case by welding.

In addition, the outer housing and the inner housing may be made of different metal materials and may be at least partially bonded to each other.

In addition, the inner housing may be made of a material having a higher melting point than a material of the outer housing.

In addition, the inner housing may have a portion having different thicknesses along a flowing direction of the venting gas.

In addition, the venting hole may be formed in a side surface of the module case, the vent cover may be attached to the side surface of the module case, and the inner housing may have a portion having different thicknesses in a vertical direction.

In addition, the outer housing and the inner housing may be partially spaced apart from each other by a predetermined distance.

In another aspect of the present disclosure, there is also provided a battery pack, comprising the battery module according to the present disclosure.

In still another aspect of the present disclosure, there is also provided a vehicle, comprising the battery module according to the present disclosure.

The inner housing may have a decreasing thickness along a flowing direction of the venting gas.

The venting hole may be formed adjacent a top edge of a side surface of the module case, and the inner housing may have a decreasing thickness along a vertical direction. The vent cover may have a first wall extending parallel to the module case, three side walls extending from three edge of the first wall, respectively, and an opening formed at a fourth edge of the first wall.

Advantageous Effects

According to the present disclosure, even if an event such as thermal runaway occurs in a specific battery module, propagation of the thermal runaway situation to other battery modules may be suppressed.

In particular, according to an embodiment of the present disclosure, the venting control function of the battery module may be continuously secured because the structure for venting provided in the battery module is stably maintained without collapsing even under a high-temperature gas or flame.

In addition, according to an embodiment of the present disclosure, with a simple structure, the effect of controlling venting of the battery module and preventing heat propagation between battery modules may be implemented.

The present disclosure may have various other effects in addition to the above, and such effects will be described in each embodiment, or any effect that can be easily inferred by those skilled in the art will not be described in detail.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
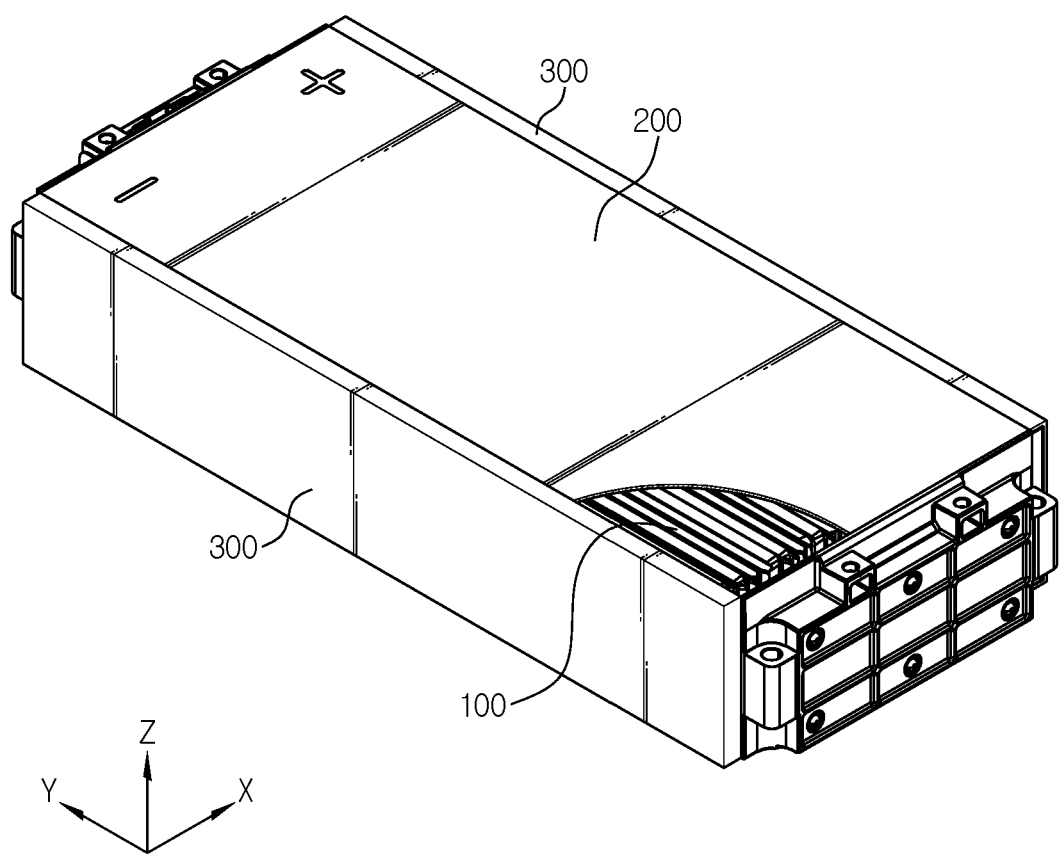
FIG. 1 is an assembled perspective view schematically showing a battery module according to an embodiment of the present disclosure.
Figure 2:
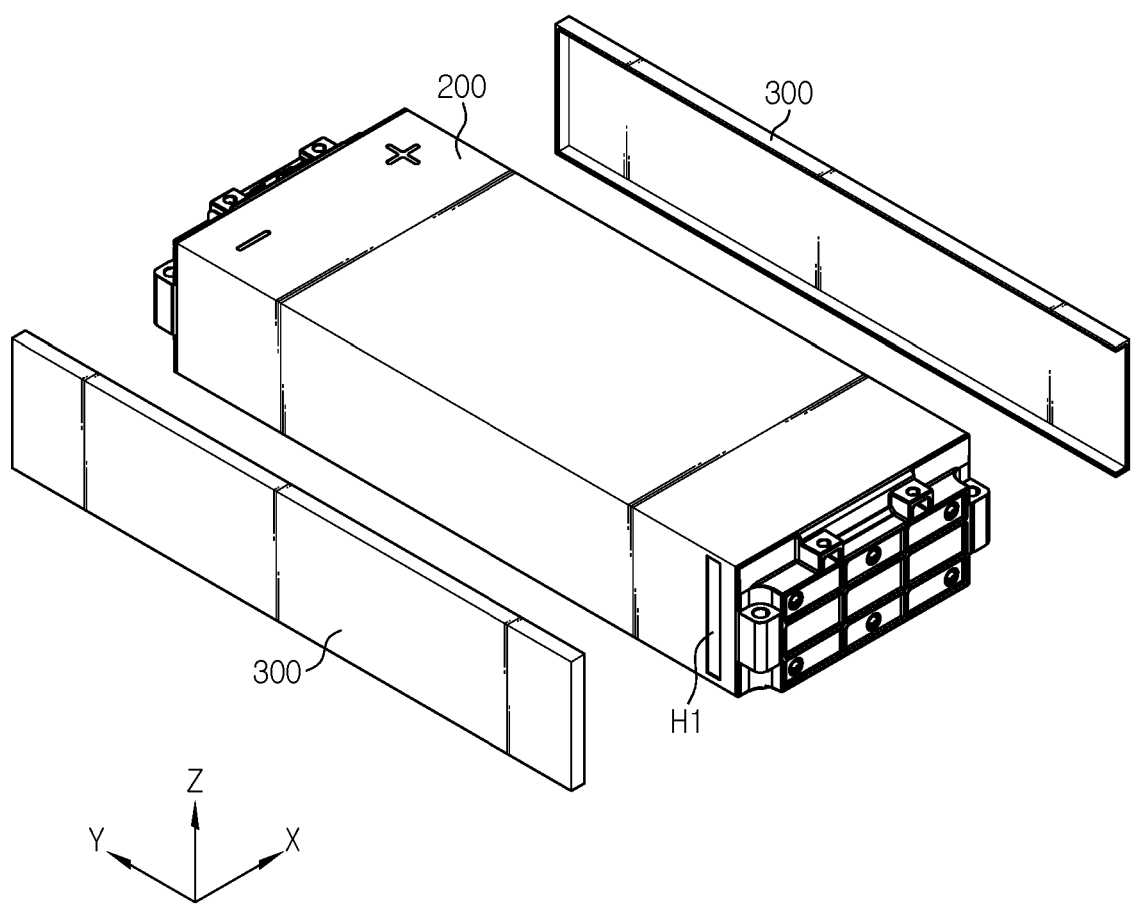
FIG. 2 is an exploded perspective view showing some components of FIG. 1.

FIG. 1 is an assembled perspective view schematically showing a battery module according to an embodiment of the present disclosure, and FIG. 2 is an exploded perspective view showing some components of FIG. 1.

Referring to FIGS. 1 and 2, the battery module according to the present disclosure includes a cell assembly 100, a module case 200, and a venting unit 300.

The cell assembly 100 may include at least one battery cell. Here, each battery cell may refer to a secondary battery. The secondary battery may include an electrode assembly, an electrolyte and a battery case. In particular, the battery cell provided in the cell assembly 100 may be a pouch-type secondary battery. However, other types of secondary batteries, such as a cylindrical battery or a rectangular battery, may also be employed in the cell assembly 100 of the present disclosure.

A plurality of secondary batteries may form the cell assembly 100 in a stacked form. For example, the plurality of secondary batteries may be stacked so as to be arranged in a horizontal direction (x-axis direction in the drawing) while being erect in an upper and lower direction (z-axis direction in the drawing), respectively. Each battery cell may include electrode leads, and the electrode leads may be located at both ends or at one end of each battery cell. A secondary battery in which the electrode leads protrude in both directions may be called a bidirectional cell, and a secondary battery in which the electrode leads protrude in one direction may be called a unidirectional cell. The present disclosure is not limited by the specific type or form of these secondary batteries, and various types of secondary batteries known at the time of filing of this application may be employed in the cell assembly 100 of the present disclosure.

The module case 200 may have an empty space formed therein and be configured to accommodate the cell assembly 100 in the inner space. For example, the module case 200 may be configured to include an upper plate, a lower plate, a left plate, a right plate, a front plate and a rear plate to define the inner space. Here, at least two or more of the upper plate, the lower plate, the left plate, the right plate, the front plate, and the rear plate may be configured in an integrated form.

Moreover, the module case 200 may have a venting hole formed in at least one side thereof, as indicated by H1 in FIG. 2. For example, the venting hole H1 may be formed in the left plate and the right plate of the module case 200, respectively. The venting hole H1 may be configured such that, when a venting gas is generated and ejected from the cell assembly 100 accommodated in the inner space, the generated venting gas may be discharged to the outer space of the module case 200. For example, the venting hole H1 may be formed in a completely open form so as to penetrate the module case 200 in an inner and outer direction. However, the venting hole H1 may not be completely opened, but may be configured to be closed in a normal state and be opened according to the change in pressure or temperature. Also, the venting hole H1 may be formed to be elongated in one direction. For example, as shown in FIG. 2, the venting hole H1 may be formed to be elongated in the upper and lower direction. In addition, the venting hole H1 may be formed in the side surface of the module case 200, particularly in the left surface and the right surface. However, the venting hole H1 may be formed in other parts of the module case 200, for example the upper surface, the lower surface, the front surface and/or the rear surface. In addition, the venting hole H1 formed in the module case 200 may be configured in various shapes other than the above shape.

The venting unit 300 may be provided at an outer side of the module case 200. In particular, the venting unit 300 may be attached to a portion of the module case 200 where the venting hole H1 is formed. For example, as shown in FIG. 2, when the venting hole H1 is formed in the left surface and the right surface of the module case 200, the venting unit 300 may be attached to the outer side of each of the left surface and the right surface of the module case 200.

The configuration of this venting unit 300 will be described in more detail with reference to FIGS. 3 and 4.

Figure 3:
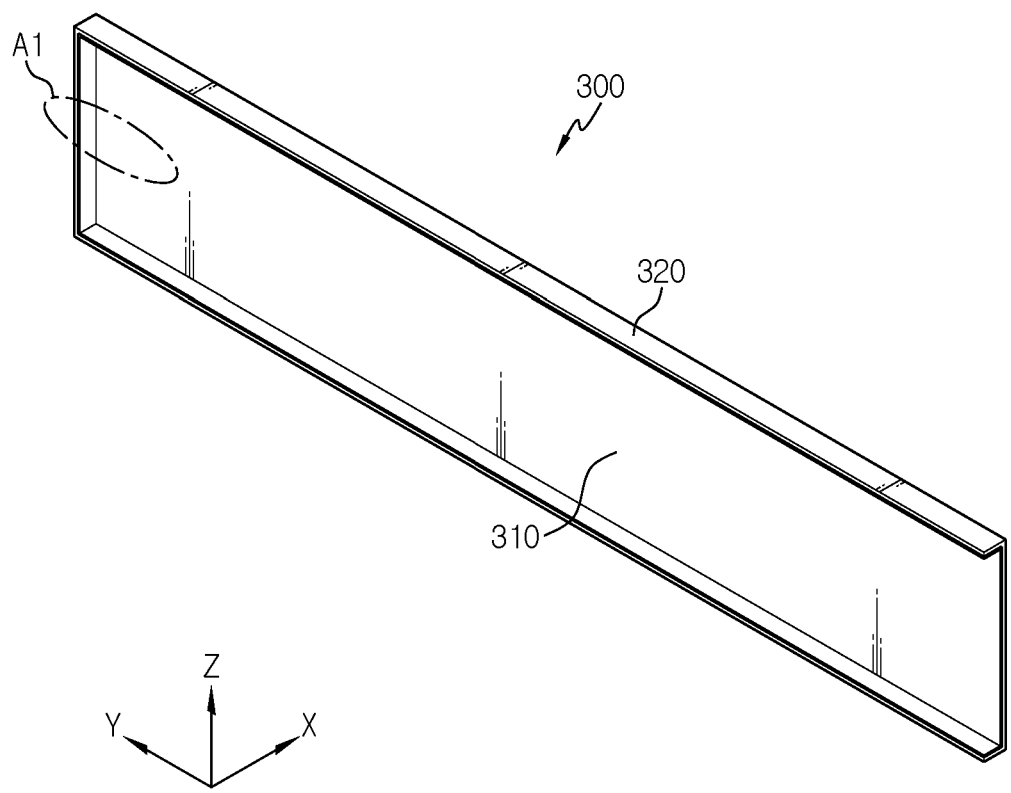
FIG. 3 is a perspective view schematically showing the configuration of a venting unit according to an embodiment of the present disclosure.
Figure 4:
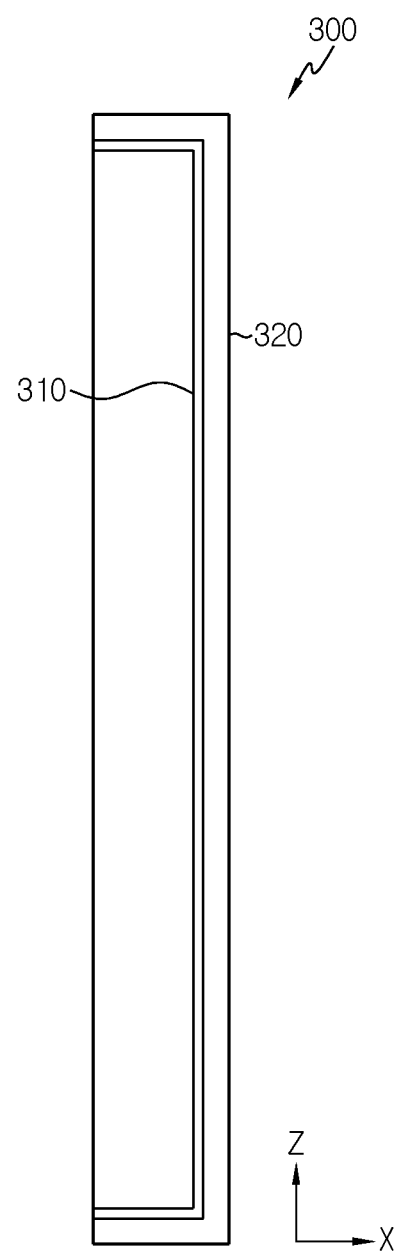
FIG. 4 is a front view showing the venting unit of FIG. 3.

FIG. 3 is a perspective view schematically showing the configuration of the venting unit 300 according to an embodiment of the present disclosure, and FIG. 4 is a front view showing the venting unit 300 of FIG. 3.

Referring to FIGS. 1 to 4, the venting unit 300 may be configured such that the venting gas discharged from the venting hole H1 is introduced and discharged to the outside. That is, the venting unit 300 may be configured to define the inner space to function as a venting channel. As a more specific example, referring to FIGS. 3 and 4, the venting unit 300 may be configured in a form that a right portion, an upper portion, a lower portion and a front portion are closed and a left portion and a rear portion are opened. Here, the inner space is defined by the closed right, upper, lower and front portions, and the inner space may function as a venting channel. In addition, venting gas may flow in and out by the open left and rear portions. Moreover, in the embodiment of FIGS. 3 and 4, the venting gas of the module case 200 may be introduced through the open left portion, and the venting gas may be discharged through the open rear portion. In this case, the venting gas discharged from the module case 200 may be introduced into the venting unit 300 to flow as indicated by an arrow in FIG. 1, and then be discharged to the outside.

In particular, the venting unit 300 may include an outer housing 320 and an inner housing 310, as shown in FIGS. 3 and 4. Here, the outer housing 320 and the inner housing 310 may be made of different materials. In addition, the venting unit 300 may be configured such that the venting gas discharged from the venting hole H1 is introduced to flow along the surface of the inner housing 310 and is discharged to the outside. That is, in the venting unit 300, the inner housing 310 may be regarded as a portion that forms a venting channel to actually contact the venting gas. In addition, in the venting unit 300, the outer housing 320 may be configured to at least partially surround the outer side of the inner housing 310. Conversely, in the venting unit 300, the inner housing 310 may be configured to at least partially cover the inner side of the outer housing 320.

In this embodiment, the venting unit 300 may be configured to mainly contact the inner housing 310 until the venting gas is introduced into the inner space and discharged to the outside. Further, the venting unit 300 may be configured such that the venting gas only contacts the inner housing 310 and does not contact the outer housing 320. However, in some embodiments, the venting gas may be configured to partially contact the outer housing 320.

According to this configuration of the present disclosure, since the inner side and the outer side of the venting unit 300 are made of different materials, materials suitable for their locations and functions may be adopted. In particular, the inner housing 310 located at the inner side of the venting unit 300 may be a portion that mainly contacts the venting gas, and the outer housing 320 located at the outer side of the venting unit 300 may be a portion that is exposed out of the battery module and partly contacts the module case 200. Accordingly, each component may be made of a material suitable for each function or location of the inner housing 310 and the outer housing 320. Therefore, in this case, it may be advantageous to stably secure the venting performance and structural rigidity of the venting unit 300.

The outer housing 320 may be configured in a plate form in which at least one end is bent. For example, referring to FIGS. 3 and 4, the outer housing 320 may be configured in an approximately erected plate form, in which an upper end, a lower end and a front end are bent in a left direction (−x-axis direction) toward the module case 200. In addition, the inner housing 310 may be configured in a form that covers the inner surface of the outer housing 320. For example, in the configuration of FIGS. 3 and 4, when the module case 200 is located at the left side of the outer housing 320, the inner housing 310 may be located on the left surface of the outer housing 320 so that the left surface of the outer housing 320 is not exposed partially or entirely. Moreover, since the inner housing 310 covers the left surface, namely the inner surface, of the outer housing 320, the inner housing 310 may be formed in a shape corresponding to the shape of the left surface of the outer housing 320. Therefore, the inner housing 310 is just slightly smaller in size than the outer housing 320, but may be configured in an approximately erected plate form, in which an upper end, a lower end and a front end are bent toward the module case 200, like the outer housing 320.

According to this configuration of the present disclosure, the venting unit 300 may be configured with a simple structure. In particular, in this case, the opening may be formed wide with respect to the inner space of the venting unit 300. Therefore, when the venting unit 300 is attached to the module case 200, the position of the venting hole formed in the module case 200 may not be greatly affected. For example, seeing the configuration of FIGS. 3 and 4, it may be regarded that the inner space of the venting unit 300 is fully opened at the left side, so that the entire left side of the venting unit 300 forms an introduction hole. Therefore, when the venting unit 300 is attached to the outer side of the module case 200, it is not seriously difficult to accurately align the location of the venting hole H1 of the module case 200 with the introduction hole of the venting unit 300, thereby improving the assembling efficiency and the manufacturing process efficiency of the battery module. In addition, in this case, one type of venting unit 300 may be attached to several types of module cases 200, thereby improving compatibility of the venting unit 300.

The venting unit 300 may be attached to the outer surface of the module case 200. In particular, the outer circumference of the outer housing 320 of the venting unit 300 may be at least partially coupled to the outer surface of the module case 200 by welding. This will be described in more detail with reference to FIG. 5.

Figure 5:
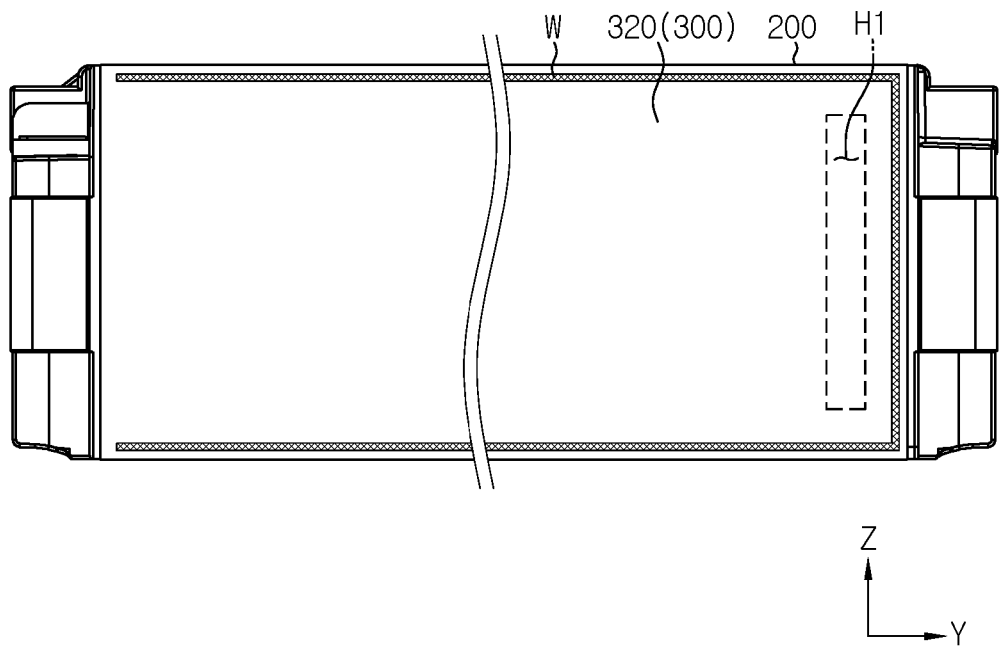
FIG. 5 is a side view showing the configuration of the battery module according to an embodiment of the present disclosure.

FIG. 5 is a side view showing the configuration of the battery module according to an embodiment of the present disclosure.

Referring to FIG. 5, in a state where the venting unit 300 is mounted to the module case 200, a portion exposed out of the venting unit 300 may be referred to as the outer housing 320. In addition, the outer housing 320 may be configured such that at least a part of the outer circumference, for example an upper end, a lower end, and a front end (a right end in the drawing), is welded, as indicated by W in FIG. 5. In particular, the upper end, the lower end and the front end of the outer housing 320 may be continuously welded. That is, in the configuration of FIG. 5, the welded portion may be formed to extend in a front direction (+y-axis direction) from the rear end of the top of the outer housing 320, to be bent and extend in a lower direction (−z-axis direction), and then to be bent again in a rear direction (−y-axis direction) to extend to the rear end.

In this case, the upper end, the lower end, and the front end of the venting unit 300 may be closed, the rear end (left end in the drawing) of the venting unit 300 may be opened. Therefore, the gas discharged from the venting hole H1 of the module case 200 may flow to the rear side of the module case 200, namely in the −y-axis direction in the drawing, and be discharged to the outside. Here, it may be regarded that the outer circumference of the outer housing 320 is entirely welded to the module case 200 as a whole except for an outlet portion through which the venting gas is discharged.

According to this configuration of the present disclosure, the venting unit 300 and the module case 200 may be assembled and fixed simply, the venting channel may be easily formed inside the venting unit 300, and the portion other than the outlet may be easily sealed.

Meanwhile, as shown in FIGS. 1 and 2, the venting unit 300 may be located at both sides of the module case 200. For example, the venting unit 300 may be attached to the left side and the right side of the module case 200, respectively. In this case, since the venting gas inside the module case 200 may be discharged to the outside through a plurality of venting paths, the venting performance may be further improved. Also, in this case, since the gas discharged from the inside of the module case 200 may be dispersed to the plurality of venting units 300, the ejection pressure of the venting gas introduced into each of the venting units 300 may be lowered.

In the above embodiment, the plurality of venting units 300, namely the left venting unit 300 and the right venting unit 300, may be configured such that the venting gas flows in opposite directions. As a more specific example, seeing the configuration of FIGS. 1 and 2, the outlet of the left venting unit 300 may be formed at the front side (+y-axis direction) of the battery module, and the outlet of the right venting unit 300 may be formed at the rear side (−y-axis direction) of the battery module. In this case, as indicated by the arrow in FIG. 1, the venting gas may be discharged in the front direction at the left venting unit 300 and discharged in the rear direction at the right venting unit 300.

According to this configuration of the present disclosure, since the venting directions are formed in opposite directions for the plurality of venting unit 300, it is possible to prevent a high-temperature gas or flame from being concentrated in a specific place or location.

The outer housing 320 and the inner housing 310 may be made of different metal materials. Moreover, the outer housing 320 and the inner housing 310 may be configured in a metal plate form, and may be configured to be at least partially surface-bonded. In particular, the venting unit 300 may be configured in a clad metal form in which metal plates of different materials are bonded to each other. That is, the venting unit 300 may be configured in a clad metal form in which a first metal plate constituting the inner housing 310 and a second metal plate constituting the outer housing 320 are bonded to each other. In this case, it may be regarded that the venting unit 300 is composed of two or more different metal layers. At this time, the metal layer located at the inner side may be called the inner housing 310, and the metal layer located at the outer side may be called the outer housing 320.

According to this configuration of the present disclosure, it is possible to secure various performances for the venting unit 300. In particular, the venting unit 300 needs to be stably maintained in terms of shape and position even though external shocks, vibrations, high-temperature gas or flames, and the like are applied thereto. In addition, when being attached to the module case 200, it is better if the venting unit 300 has more excellent assembling efficiency. In the embodiment, since different metal materials exist in one venting unit 300, the venting unit 300 may have several characteristics together.

The inner housing 310 may be made of a material having a higher melting point than the outer housing 320. In particular, both the inner housing 310 and the outer housing 320 may be made of metal materials, and moreover, they may be bonded to each other to form a clad metal. Here, the inner housing 310 may be made of a metal material having a higher melting point than the outer housing 320. The inner housing 310 may be regarded as a portion that directly contacts the venting gas, flames, sparks, or the like discharged from the venting unit 300. Therefore, it is preferable that the inner housing 310 is made of a material that does not melt easily but withstand well even at high temperatures.

Meanwhile, the outer housing 320 may be made of a material with excellent structural rigidity or weldability, although its melting point is somewhat lower than that of the inner housing 310. In particular, as described above in FIG. 5 and the like, the outer housing 320 positioned at the outer side of the venting unit 300 may be welded to the module case 200. For example, the outer housing 320 may be welded to the outer surface of the module case 200 by laser welding or brazing welding. Accordingly, the outer housing 320 may be made of a material having good weldability with the module case 200 while having structural rigidity or corrosion resistance of a certain level or more.

For example, the outer housing 320 may be made of an aluminum material. In this case, the inner housing 310 may be made of a material having a higher melting point than the material of the outer housing 320. For example, the inner housing 310 may be made of a material having a high melting point, such as iron (Fe) or SUS (Steel Use Stainless).

According to this configuration of the present disclosure, the venting performance of the venting unit 300 may be secured more stably. That is, the venting unit 300 may secure a strong coupling force with the module case 200 by the outer housing 320, and high-temperature stability against the venting gas or flames may be secured by the inner housing 310. In particular, when an event such as thermal runaway occurs, the gas or flame discharged through the venting hole H1 from the inside of the module case 200 may have a very high temperature. Here, since the inner housing 310 directly exposed to the gas or flame is made of a material having strong heat resistance, it is possible to prevent the venting unit 300 from structurally collapsing even due to a high temperature of the gas or flame.

Figure 6:
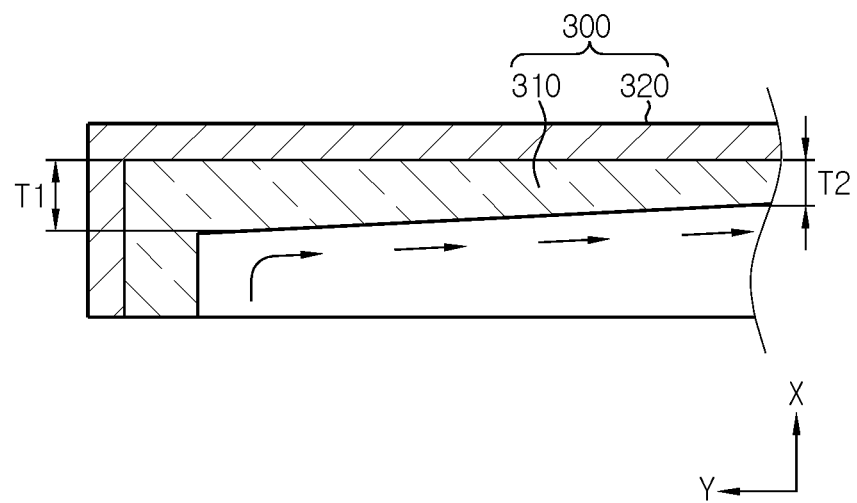
FIG. 6 is a sectional view schematically showing the configuration of the venting unit according to an embodiment of the present disclosure.

FIG. 6 is a sectional view schematically showing the configuration of the venting unit 300 according to an embodiment of the present disclosure. For example, FIG. 6 may be a diagram showing a sectional configuration of an example of the venting unit 300 of FIG. 3 in which a portion A1 is modified, viewed from the above.

Referring to FIG. 6, the inner housing 310 may be partially configured to have different thicknesses. In particular, the inner housing 310 may be configured to have a portion with different thicknesses along a flowing direction of the venting gas. For example, in the configuration of FIG. 6, the flowing direction of the venting gas may be regarded as a −y-axis direction as indicated by an arrow. At this time, the inner housing 310 may have different thicknesses in the flowing direction of the venting gas.

As a more specific example, in the configuration of FIG. 6, a thickness T1 of a portion of the inner housing 310 and a thickness T2 of another portion of the inner housing 310 may be different. Moreover, in the configuration of FIG. 6, it may be regarded that the thickness T1 is greater than the thickness T2. In addition, in the inner space of the venting unit 300, a portion marked with the thickness T1 may be regarded as being located at an upstream side in the flow of the venting gas than a portion marked with the thickness T2. Accordingly, in the embodiment of FIG. 6, the thickness of the inner housing 310 is formed differently along the flowing direction of the venting gas, and in particular, it may be regarded that the thickness T1 at an upstream side is greater than the thickness T2 at a downstream side. Moreover, the inner housing 310 may be configured such that the thickness gradually decreases toward the outlet at least partially. At this time, as shown in FIG. 6, the inner surface of the inner housing 310 may have an inclined surface, so that the venting channel gradually widens toward the outlet.

According to this embodiment of the present disclosure, even if a high-temperature gas or flame is introduced into the venting unit 300, the structural stability of the venting unit 300 may be more reliably ensured. In particular, even in the same inner housing 310, the applied temperature or pressure may vary depending on the location. Moreover, at an upstream side of the venting flow path, namely in a portion close to the venting hole H1 of module case 200, since the gas or flame ejected from the venting hole H1 contacts first, the applied pressure or heat may be relatively large compared to other portions of the inner housing 310. Therefore, if the inner housing 310 is formed to have a greater thickness as being located at an upstream side of the venting channel as in this embodiment, structural stability may be maintained even under high pressure or heat. In addition, in this case, at the inside of the venting unit 300, namely at the inner housing 310 side, the upstream side may be formed to have a higher temperature than the downstream side, but the heat of the upstream side may not be transferred to the outside of the venting unit 300, namely the outer housing 320. Therefore, it is possible to prevent heat from being transferred from the upstream side of the venting unit 300, namely a portion where the venting hole H1 is formed, to other components located out of the battery module, for example another battery module.

Moreover, the inner housing 310 may be formed to have a greater thickness in a portion facing the venting hole H1 than other portions. In the inner housing 310, in the portion facing the venting hole H1, the gas or flame ejected from the venting hole H1 may flow in a direction substantially perpendicular to the surface of the inner housing 310. Meanwhile, in other portions of the inner housing 310, namely in portions other than the part facing the venting hole H1, the gas or flame may flow in a direction generally parallel to the surface of the inner housing 310.

Therefore, if the portion of the inner housing 310 facing the venting hole H1 has a greatest thickness as in this embodiment, the inner housing 310 may not be easily damaged or broken even by high-temperature and high-pressure spraying force caused by the gas or flame, but may maintain its shape stably.

Figure 7:
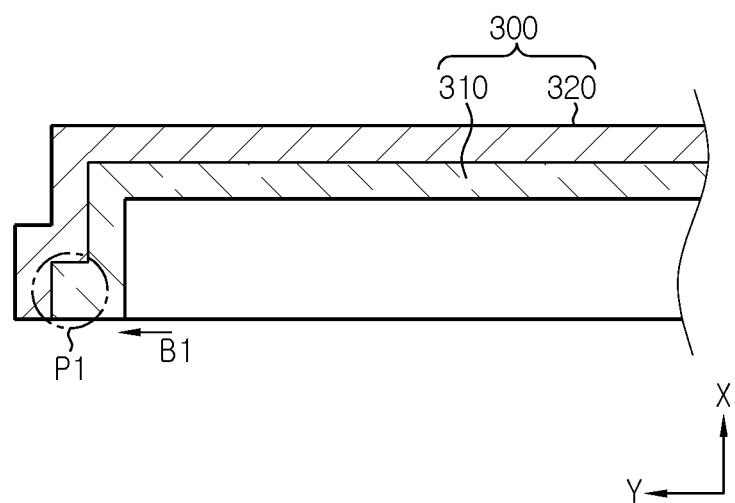
FIG. 7 is a sectional view schematically showing the configuration of a venting unit according to another embodiment of the present disclosure.

FIG. 7 is a sectional view schematically showing the configuration of a venting unit 300 according to another embodiment of the present disclosure. For example, FIG. 7 may be a modified embodiment of FIG. 6.

Referring to FIG. 7, the inner housing 310 may be configured such that at least one end thereof is bent toward the outer housing 320, like the portion indicated by P1. That is, in the configuration of FIG. 7, in the inner housing 310, the end of a portion extending in the +y-axis direction to form a venting channel may be bent in the −x-axis direction. In addition, the end of this inner housing in the −x-axis direction may be configured to be bent again in the +y-axis direction. In addition, a groove may be formed in the outer housing 320 in a shape for accommodating the bent end of the inner housing 310. For example, as in the portion indicated by P1 in FIG. 7, the outer housing 320 may be configured such that the end of a portion extending in the +y-axis direction is sequential bent in the −x-axis direction, the +y-axis direction, and the −x-axis direction. In addition, the bent end of the inner housing 310 may be inserted into the groove at the end of the outer housing 320 formed through such a bending shape.

According to this embodiment of the present disclosure, since the end of the inner housing 310 is configured to be inserted into the end of the outer housing 320, the coupling between the outer housing 320 and the inner housing 310 may be improved. In addition, according to this embodiment, it is possible to prevent the outer housing 320 from being damaged by the venting gas. In particular, the portion indicated by the arrow B1 in FIG. 7 may be regarded as a portion that is in contact with the module case 200. At this time, in this embodiment, even if the gas is introduced into B1, by increasing the path through which the introduced gas reaches the outer housing 320, it is possible to suppress the high-temperature gas from damaging the outer housing 320.

In addition, the venting hole H1 may be formed in the side surface of the module case 200. Also, the venting unit 300 may be attached to the side surface of the module case 200 corresponding to the position of the venting hole. For example, the venting hole may be formed in the left surface and the right surface of the module case 200 as shown in FIG. 2. In addition, the venting unit 300 may be attached to the left surface and the right surface of the module case 200.

In particular, the venting unit 300 may be configured to have a portion in which the inner housing 310 has different thicknesses in the upper and lower direction. This will be described in more detail with reference to FIG. 8.

Figure 8:
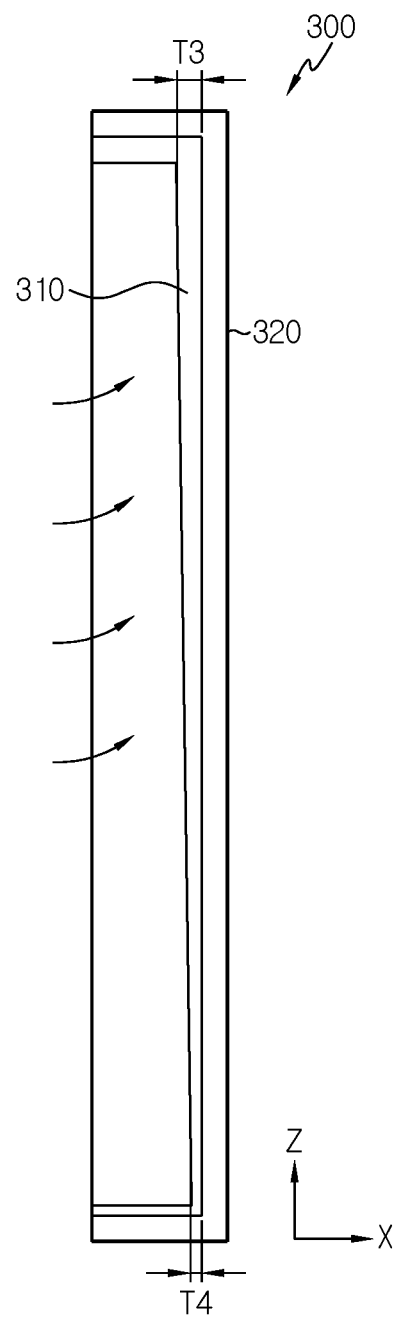
FIG. 8 is a front view showing the configuration of a venting unit according to still another embodiment of the present disclosure.

FIG. 8 is a front view showing the configuration of a venting unit 300 according to still another embodiment of the present disclosure. FIG. 8 may be regarded as another modification to the drawing of FIG. 4.

Referring to FIG. 8, in the inner housing 310, an upper portion may be formed to have a greater thickness than a lower side. More specifically, as shown in the figure, when the thickness of a part of the upper portion of the inner housing 310 is referred to as T3 and the thickness of a part of the lower portion of the inner housing 310 is referred to as T4, T3 may be greater than T4.

According to this configuration of the present disclosure, when the venting gas flows inside the venting unit 300, the structural stability of the venting unit 300 may be more reliably maintained. In particular, when the venting gas is introduced into the venting unit 300 from the venting hole of the module case 200, the venting gas may be introduced as a whole from the upper portion to the lower portion of the inner housing 310. However, since the temperature of the venting gas is high, the venting gas introduced into the inner space of the venting unit 300 is directed upward in the inner space of the venting unit 300, as indicated by the arrow in FIG. 8. Accordingly, more thermal energy may be applied to the upper portion in the inner space of the venting unit 300 than the lower portion therein. However, according to this embodiment, since the upper portion of the inner housing 310 is formed to have a greater thickness than the lower portion, it is possible to effectively cope with the thermal stress applied to the upper portion. Therefore, in this embodiment, stability against thermal stress may be ensured for the entire venting unit 300.

Figure 9:
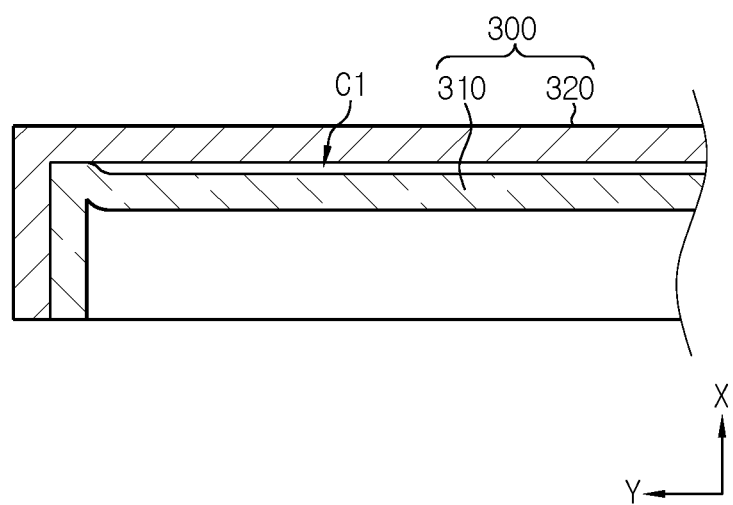
FIG. 9 is a sectional view schematically showing the configuration of a venting unit according to still another embodiment of the present disclosure.

FIG. 9 is a sectional view schematically showing the configuration of a venting unit 300 according to still another embodiment of the present disclosure. For example, FIG. 9 may be regarded as another embodiment modified from FIG. 6.

Referring to FIG. 9, the outer housing 320 and the inner housing 310 may be configured to be at least partially spaced apart from each other by a predetermined distance. For example, the venting unit 300 may be configured such that an empty space is formed between the outer housing 320 and the inner housing 310, as in the portion indicated by Cl in the configuration of FIG. 9. At this time, a gas layer such as an air layer may be formed in the empty space between the outer housing 320 and the inner housing 310. In particular, the venting unit 300 may be configured such that a separated space exists between the outer housing 320 and the inner housing 310 in the portion facing the venting hole.

According to this embodiment of the present disclosure, the heat insulating performance may be improved by the gas layer, for example the air layer, located in the separated space between the outer housing 320 and the inner housing 310. That is, according to this embodiment, it is possible to suppress the heat from being transferred from the inner housing 310 to the outer housing 320. Accordingly, propagation of thermal runaway to other battery modules located outside the outer housing 320 may be reduced.

In addition, according to this embodiment, the separated space between the outer housing 320 and the inner housing 310 may function as a buffer space for pressure or force. In particular, the venting gas ejected from the venting hole may pressurize the inner housing 310. At this time, by the empty space between the inner housing 310 and the outer housing 320, the pressing force on the inner housing 310 may be buffered, thereby reducing the transmission of the pressing force to the outer housing 320. Accordingly, the coupling force between the outer housing 320 and the module case 200 may be prevented or reduced from being released or damaged by the ejection pressure of the venting gas. Therefore, in this case, the structural stability of the venting unit 300 may be further improved.

A battery pack according to the present disclosure may include one or more battery modules according to the present disclosure described above. In addition, the battery pack according to the present disclosure may further include various other components, for example components of a battery pack known at the time of filing of this application, such as a BMS, a bus bar, a pack case, a relay, a current sensor, and the like, in addition to the battery module.

The battery module according to the present disclosure may be applied to a vehicle such as an electric vehicle or a hybrid electric vehicle. That is, the vehicle according to the present disclosure may include the battery module according to the present disclosure or the battery pack according to the present disclosure. In addition, the vehicle according to the present disclosure may further include various other components included in a vehicle in addition to the battery module or the battery pack. For example, the vehicle according to the present disclosure may further include a vehicle body, a motor, a control device such as an electronic control unit (ECU), and the like in addition to the battery module according to the present disclosure.

Meanwhile, in this specification, terms indicating directions such as "up", "down", "left", "right", "front" and "rear" used, but these terms are merely for convenience of description and may vary depending on the location of an object or the location of an observer, as apparent to those skilled in the art.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

100: cell assembly
200: module case
300: venting unit
310: inner housing, 320: outer housing

What is claimed is:

1. A battery module, comprising:
a cell assembly having at least one battery cell;
a module case configured to accommodate the cell assembly in an inner space thereof and have a venting hole formed therein to discharge a venting gas generated from the cell assembly, the module case having an upper plate, a lower plate opposite the upper plate, a first side plate and a second side plate spaced from the first side plate, the venting hole formed in the first side plate; and
a vent cover formed separately from and attached to an exterior of the first side plate of the module case and including an outer housing and an inner housing made of different materials, the vent cover being configured such that the venting gas discharged from the venting hole is introduced therein to flow along a surface of the inner housing and is discharged to the outside,
wherein the inner housing is made of a material having a higher melting point than a material of the outer housing; and
wherein the outer housing and the inner housing are made of different metal materials and are at least partially bonded to each other.

2. The battery module according to claim 1, wherein the outer housing is configured in a plate form having at least one end bent, and the inner housing is configured to cover an inner surface of the outer housing.

3. The battery module according to claim 1, wherein an outer perimeter of the outer housing is at least partially coupled to an outer surface of the module case by welding.

4. The battery module according to claim 1, wherein the inner housing has a portion having different thicknesses along a flowing direction of the venting gas.

5. The battery module according to claim 1, wherein the venting hole is formed in a side surface of the module case, and wherein the vent cover is attached to the side surface of the module case, and the inner housing has a portion having different thicknesses in a vertical direction.

6. The battery module according to claim 1, wherein the outer housing and the inner housing are partially spaced apart from each other by a predetermined distance.

7. A battery pack, comprising the battery module according to claim 1.

8. A vehicle, comprising the battery module according to claim 1.

9. The battery module according to claim 1, wherein the inner housing has a decreasing thickness along a flowing direction of the venting gas.

10. The battery module according to claim 1, wherein the venting hole is formed adjacent a top edge of a side surface of the module case, and
wherein the inner housing has a decreasing thickness along a vertical direction.

11. The battery module according to claim 1, wherein the vent cover has a first wall extending parallel to the module case, three side walls extending from three edges of the first wall, respectively, and an opening formed at a fourth edge of the first wall.

12. The battery module according to claim 1, wherein the upper plate, the lower plate, the first side plate and the second side plate are formed in an integrated form.

13. The battery module according to claim 1, wherein the vent cover is welded to an outer surface of the module case.

14. The battery module according to claim 1, wherein the vent cover has a main wall parallel to the first side plate and a side wall extending between the main wall and the first side plate,
wherein an outlet is formed in the side wall, and
wherein a thickness of the inner housing on the main wall decreases in a direction toward the outlet.

* * * * *